(12) United States Patent
Yuzuriha

(10) Patent No.: US 11,967,304 B2
(45) Date of Patent: Apr. 23, 2024

(54) SOUND PICK-UP DEVICE, SOUND PICK-UP METHOD AND NON-TRANSITORY COMPUTER-READABLE RECORDING MEDIUM RECORDING SOUND PICK-UP PROGRAM

(71) Applicant: Panasonic Intellectual Property Corporation of America, Torrance, CA (US)

(72) Inventor: Shinichi Yuzuriha, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 163 days.

(21) Appl. No.: 17/846,825

(22) Filed: Jun. 22, 2022

(65) Prior Publication Data

US 2022/0319489 A1 Oct. 6, 2022

Related U.S. Application Data

(63) Continuation of application No. PCT/JP2020/041412, filed on Nov. 5, 2020.
(Continued)

(30) Foreign Application Priority Data

Aug. 28, 2020 (JP) ................. 2020-144392

(51) Int. Cl.
*H04R 3/02* (2006.01)
*G10K 11/178* (2006.01)
(Continued)

(52) U.S. Cl.
CPC ....... *G10K 11/17854* (2018.01); *H04M 9/082* (2013.01); *H04R 3/02* (2013.01); *G10L 2021/02082* (2013.01)

(58) Field of Classification Search
CPC . H04R 3/02; H04M 9/082; G10L 2021/02082
See application file for complete search history.

(56) References Cited

U.S. PATENT DOCUMENTS

| 7,133,529 B2 | 11/2006 | Ura |
| 9,947,336 B2 | 4/2018 | Shi et al. |

(Continued)

FOREIGN PATENT DOCUMENTS

JP 5205935 B2 6/2013

OTHER PUBLICATIONS

Extended European Search Report, dated Feb. 9, 2023, by the European Patent Office (EPO), in corresponding European Patent Application No. 20906191.0.
(Continued)

*Primary Examiner* — Ping Lee
(74) *Attorney, Agent, or Firm* — Greenblum & Bernstein, P.L.C.

(57) ABSTRACT

A sound pick-up device includes an adaptive filter configured to generate, from a reference signal, an estimated noise signal indicating a component of a noise signal contained in an input signal, a noise elimination signal generator configured to generate a noise elimination signal by subtracting the estimated noise signal from the input signal, a filter coefficient update unit configured to update a filter coefficient of the adaptive filter using the noise elimination signal, and a sample position identification unit configured to identify at least one signal sample position among a plurality of signal sample positions from a signal sample position where the noise elimination signal has a maximum absolute value to a signal sample position where the noise elimination signal has an absolute value that is largest at a predetermined order, in which the filter coefficient update unit updates the filter coefficient at the at least one signal sample position.

9 Claims, 4 Drawing Sheets

Related U.S. Application Data

(60) Provisional application No. 62/953,737, filed on Dec. 26, 2019.

(51) Int. Cl.
  *H04M 9/08* (2006.01)
  *G10L 21/0208* (2013.01)

(56) References Cited

U.S. PATENT DOCUMENTS

| | | |
|---|---|---|
| 2003/0012388 A1 | 1/2003 | Ura |
| 2012/0250852 A1 | 10/2012 | Rowley |
| 2016/0019909 A1 | 1/2016 | Shi et al. |

OTHER PUBLICATIONS

International Search Report, dated Dec. 8, 2020, by the Japan Patent Office (JPO), in International Application No. PCT/JP2020/041412.

SOUND PICK-UP DEVICE, SOUND PICK-UP METHOD AND NON-TRANSITORY COMPUTER-READABLE RECORDING MEDIUM RECORDING SOUND PICK-UP PROGRAM

TECHNICAL FIELD

The present disclosure relates to a sound pick-up device, a sound pick-up method, and a sound pick-up program for removing a noise signal contained in an input signal acquired by a microphone.

BACKGROUND ART

Conventionally, there is a two-way call system of an amplification type, which use a microphone and a speaker. This kind of two-way call system of an amplification type is configured such that a voice spoken by a talker on a transmitting side is input to a microphone on a transmitting side and is transmitted as a telephone transmission signal to a device on a receiving side via a communication line, and then is reproduced by a speaker on the receiving side. The voice reproduced by the speaker on the receiving side propagates through a space on the receiving side and is input to a microphone on the receiving side, and then is transmitted to the transmitting side. At this time, the speaker on the transmitting side reproduces the voice uttered by the talker after elapse of time during which the voice has passed through the communication line and time during which the voice has propagated through the space on the receiving side. The voice propagating from the speaker on the receiving side to the microphone as described above is called an acoustic echo that leads to deterioration of call quality.

For example, Patent Literature 1 discloses a noise elimination device configured as follows: generating a first sound receiving signal corresponding to a voice and noise received by a voice input terminal; generating a second sound receiving signal corresponding to a noise received by a reference input terminal; generating a pseudo noise signal from the second sound receiving signal with an adaptive filter; generating a noise suppression signal by subtracting the pseudo noise signal from the first sound receiving signal; updating a filter coefficient of the adaptive filter by using the noise suppression signal; deriving a peak tap position indicating a tap at which the filter coefficient has a peak value according to a relative positional relationship among a noise source, a reference input terminal, and a voice input terminal; classifying a section of the tap position corresponding to the filter coefficient by using the peak tap position; and controlling an update frequency of the filter coefficient corresponding to the classified section for each classified section.

However, the above conventional technique needs to be further improved to reduce the amount of calculation for eliminating noise.

CITATION LIST

Patent Literature

Patent Literature 1: JP 5205935 B2

SUMMARY OF INVENTION

The present disclosure has been made to solve the above problem, and an object thereof is to provide a technique capable of reducing the amount of calculation for eliminating noise.

A sound pick-up device according to an aspect of the present disclosure includes: an adaptive filter configured to generate, from a reference signal, an estimated noise signal indicating a component of a noise signal contained in an input signal acquired by a microphone; a signal generator configured to generate a noise elimination signal by subtracting the estimated noise signal from the input signal; a coefficient update unit configured to update a filter coefficient of the adaptive filter using the noise elimination signal; and an identification unit configured to identify at least one signal sample position among a plurality of signal sample positions from a signal sample position where the noise elimination signal has a maximum absolute value to a signal sample position where the noise elimination signal has an absolute value that is largest at a predetermined order, wherein the coefficient update unit updates the filter coefficient at the at least one signal sample position identified by the identification unit.

According to the present disclosure, the amount of calculation for eliminating noise can be reduced.

DESCRIPTION OF EMBODIMENTS

Underlying Knowledge of Present Disclosure

Figure 1:
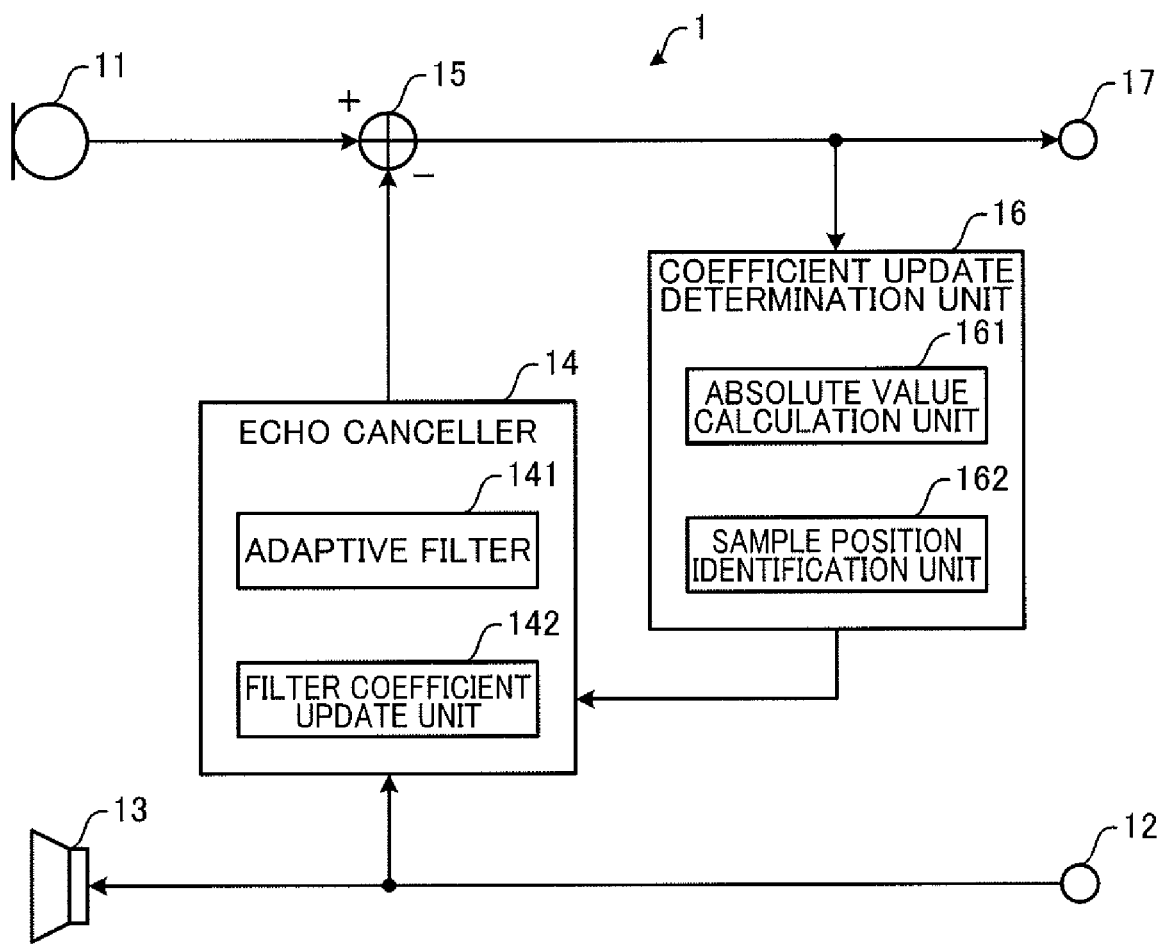
FIG. 1 is a diagram illustrating a configuration of a call device according to a first embodiment of the present disclosure.

The above conventional technique is configured as follows: deriving a peak tap position indicating a tap at which a filter coefficient has a peak value from a relative positional relationship among a noise source, a reference input terminal, and a voice input terminal; classifying a section of a tap position corresponding to the filter coefficient using the peak tap position; and controlling an update frequency of the filter coefficient corresponding to the section for each classified section. That is, the conventional technique is configured such that a first section near the peak tap position is identified, and an update frequency of the filter coefficient in a section other than the first section is set lower than an update frequency of the filter coefficient in the first section. This configuration allows the conventional technique to reduce the update frequency of the filter coefficient in the section in which the filter coefficient has a small fluctuation due to a device or an environment, and thus reducing the amount of calculation.

The above conventional technique calculates the peak tap position indicating the tap at which the filter coefficient has the peak value is calculated based on the relative positional relationship among the noise source, the reference input terminal, and the voice input terminal, but does not calculate a peak value of a difference signal obtained by subtracting the pseudo noise signal generated by the adaptive filter from the signal generated by the voice input terminal. Thus, the above conventional technique is considered to be able to achieve further improvement in further reducing the amount of calculation for eliminating noise.

To solve the above problem, a sound pick-up device according to an aspect of the present disclosure includes: an adaptive filter configured to generate, from a reference signal, an estimated noise signal indicating a component of a noise signal contained in an input signal acquired by a microphone; a signal generator configured to generate a noise elimination signal by subtracting the estimated noise signal from the input signal; a coefficient update unit configured to update a filter coefficient of the adaptive filter using the noise elimination signal; and an identification unit configured to identify at least one signal sample position among a plurality of signal sample positions from a signal sample position where the noise elimination signal has a maximum absolute value to a signal sample position where the noise elimination signal has an absolute value that is largest at a predetermined order, wherein the coefficient update unit updates the filter coefficient at the at least one signal sample position identified by the identification unit.

The filter coefficient has been conventionally updated at every signal sample position of a predetermined sampling frequency. In contrast, the present configuration identifies at least one signal sample position among the plurality of signal sample positions from the signal sample position where the noise elimination signal has the maximum absolute value to the signal sample position where the noise elimination signal has the absolute value that is largest at a predetermined order, and the filter coefficient of the adaptive filter is updated at the identified at least one signal sample position. Thus, the number of times of update processing of the filter coefficient of the adaptive filter is reduced, so that the amount of calculation for eliminating noise can be reduced.

In the above sound pick-up device, the at least one signal sample position may be a signal sample position where the noise elimination signal has a maximum absolute value.

This configuration allows the filter coefficient of the adaptive filter to be updated at the signal sample position where the noise elimination signal has the maximum absolute value, so that the number of times of update processing of the filter coefficient is once per frame, and thus the amount of calculation for eliminating noise can be further reduced.

In the above sound pick-up device, the reference signal may be a reproduction signal output to a speaker.

This configuration enables removing a component of an acoustic echo contained in the input signal acquired by the microphone.

In the above sound pick-up device, the coefficient update unit may change an update speed, at which the filter coefficient is updated, in accordance with the magnitude of the absolute value of the noise elimination signal at the at least one signal sample position.

This configuration enables the noise elimination signal to be roughly converged by increasing the update speed, for example, and the noise elimination signal to be finely converged by decreasing the update speed.

Additionally, in the above sound pick-up device, the coefficient update unit may increase the update speed to more than the current update speed when the absolute value of the noise elimination signal at the at least one signal sample position is larger than a threshold, and reduce the update speed to less than the current update speed when the absolute value of the noise elimination signal at the at least one signal sample position is equal to or less than the threshold.

This configuration sets the update speed to more than the current update speed when the noise elimination signal at the at least one signal sample position has an absolute value larger than the threshold, so that the noise elimination signal can be roughly converged. When the noise elimination signal at the at least one signal sample position has an absolute value equal to or less than the threshold value, the update speed is set slower than the current update speed, and thus the noise elimination signal can be finely converged. As a result, improvement in both the calculation speed and the calculation accuracy can be achieved.

The above sound pick-up device may further include: a first band division unit that divides the input signal into a plurality of frequency bands; a second band division unit that divides the reference signal into the plurality of frequency bands; and a band synthesis unit that synthesizes the noise elimination signal generated for each of the plurality of frequency bands, in which the adaptive filter may include a plurality of adaptive filters that each generate the estimated noise signal for the corresponding one of the frequency bands; the signal generator may include a plurality of signal generators that each generate the noise elimination signal for the corresponding one of the plurality of frequency bands; the identification unit may include a plurality of identification units that each identify the at least one signal sample position for the corresponding one of the plurality of frequency bands; and the coefficient update unit may include a plurality of coefficient update units that each update the filter coefficient at the at least one signal sample position for the corresponding one of the a plurality of frequency bands.

This configuration allows the input signal and the reference signal to be divided into the plurality of frequency bands, and allows performing generation processing of the estimated noise signal, generation processing of the noise elimination signal, identification processing of the signal sample position, and update processing of the filter coefficient for each of the plurality of frequency bands. Thus, calculation time can be shortened, and the amount of calculation per unit time can be reduced.

In the above sound pick-up device, the adaptive filter may include a first adaptive filter that generates, from a reference signal, a first estimated noise signal indicating a component of a noise signal contained in a first input signal acquired by a first microphone, and a second adaptive filter that generates, from the reference signal, a second estimated noise signal indicating a component of a noise signal contained in a second input signal acquired by a second microphone different from the first microphone; the signal generator may include a first signal generator that generates a first noise elimination signal obtained by subtracting the first estimated noise signal from the first input signal, and a second signal generator that generates a second noise elimination signal obtained by subtracting the second estimated noise signal from the second input signal; the coefficient update unit may include a first coefficient update unit that updates a filter coefficient of the first adaptive filter using the first noise elimination signal, and a second coefficient update unit that updates a filter coefficient of the second adaptive filter using the second noise elimination signal; and the identification unit includes a first identification unit that identifies at least one signal sample position among a plurality of signal sample positions from a signal sample position where the first noise elimination signal has a maximum absolute value to a signal sample position where the first noise elimination signal has an absolute value that is largest at a predetermined order, and a second identification unit that identifies at least one signal sample position among a plurality of signal sample positions from a signal sample position where the second noise elimination signal has a maximum absolute value to a signal sample position where the second noise elimination signal has an absolute value that is largest at a predetermined order.

This configuration allows each of the adaptive filter, the signal generator, the coefficient update unit, and the identification unit to be increased in number by one every time when the microphones are increased in number by one. However, even when the microphones are increased in number, the amount of calculation of each processing is reduced as compared with the related art, and thus the amount of calculation of the entire processing can be reduced as compared with the related art.

A sound pick-up method according to another aspect of the present disclosure is for a sound pick-up device including an adaptive filter, a signal generator, a coefficient update unit, and an identification unit, the sound pick-up method including the steps of: causing the adaptive filter to generate, from a reference signal, an estimated noise signal indicating a component of a noise signal contained in an input signal acquired by a microphone; causing the signal generator to generate a noise elimination signal obtained by subtracting the estimated noise signal from the input signal; causing the identification unit to identify at least one signal sample position among a plurality of signal sample positions from a signal sample position where the noise elimination signal has a maximum absolute value to a signal sample position where the noise elimination signal has an absolute value that is largest at a predetermined order; and causing the coefficient update unit to update a filter coefficient of the adaptive filter using the noise elimination signal at the identified at least one signal sample position.

The filter coefficient has been conventionally updated at every signal sample position of a predetermined sampling frequency. In contrast, the present configuration identifies at least one signal sample position among the plurality of signal sample positions from the signal sample position where the noise elimination signal has the maximum absolute value to the signal sample position where the noise elimination signal has the absolute value that is largest at a predetermined order, and the filter coefficient of the adaptive filter is updated at the identified at least one signal sample position. Thus, the number of times of update processing of the filter coefficient of the adaptive filter is reduced, so that the amount of calculation for eliminating noise can be reduced.

A non-transitory computer-readable recording medium recording a sound-pickup program according to another aspect of the present disclosure causes a computer to function as: an adaptive filter configured to generate, from a reference signal, an estimated noise signal indicating a component of a noise signal contained in an input signal acquired by a microphone; a signal generator configured to generate a noise elimination signal by subtracting the estimated noise signal from the input signal; a coefficient update unit configured to update a filter coefficient of the adaptive filter using the noise elimination signal; and an identification unit configured to specify at least one signal sample position among a plurality of signal sample positions from a signal sample position where the noise elimination signal has a maximum absolute value to a signal sample position where the noise elimination signal has an absolute value that is largest at a predetermined order, wherein the coefficient update unit updates the filter coefficient at the at least one signal sample position specified by the identification unit.

The filter coefficient has been conventionally updated at every signal sample position of a predetermined sampling frequency. In contrast, the present configuration identifies at least one signal sample position among the plurality of signal sample positions from the signal sample position where the noise elimination signal has the maximum absolute value to the signal sample position where the noise elimination signal has the absolute value that is largest at a predetermined order, and the filter coefficient of the adaptive filter is updated at the identified at least one signal sample position. Thus, the number of times of update processing of the filter coefficient of the adaptive filter is reduced, so that the amount of calculation for eliminating noise can be reduced.

Hereinafter, embodiments of the present disclosure will be described with reference to the accompanying drawings. The following embodiments are merely examples embodying the present disclosure, and do not limit the technical scope of the present disclosure.

First Embodiment

FIG. 1 is a diagram illustrating a configuration of a call device according to a first embodiment of the present disclosure. The call device is used in an amplifying hands-free call system mounted on an automobile or the like, an amplifying two-way communication conference system, an intercom system, and the like.

The call device illustrated in FIG. 1 includes a sound pick-up device 1, a microphone 11, an input terminal 12, a speaker 13, and an output terminal 17.

The microphone 11 is disposed in a space where a talker is present and collects a voice of the talker. The microphone 11 outputs an input signal indicating the collected voice to the sound pick-up device 1.

The input terminal 12 outputs a reproduction signal received from a call device (not illustrated) on a receiving side to the sound pick-up device 1 and the speaker 13.

The speaker 13 outputs the reproduction signal received to the outside. Here, when a voice output from the speaker 13 is collected by the microphone 11, the voice uttered by the talker on the receiving side is reproduced from a speaker on the receiving side with a delay, and thus causing a so-called acoustic echo.

The sound pick-up device 1 includes an echo canceller 14, a noise elimination signal generator 15, and a coefficient update determination unit 16.

The echo canceller 14 includes an adaptive filter 141 and a filter coefficient update unit 142.

The adaptive filter 141 generates, from a reference signal, an estimated noise signal indicating a component of a noise signal contained in the input signal acquired by the microphone 11. The reference signal is, for example, a reproduction signal output to the speaker 13. The noise signal is, for example, an acoustic echo signal. The adaptive filter 141 convolves the filter coefficient and the reference signal to generate the estimated noise signal indicating the component of the noise signal contained in the input signal. The estimated noise signal is also referred to as a pseudo echo signal.

The noise elimination signal generator 15 generates the noise elimination signal that is to be obtained by subtracting the estimated noise signal from the input signal. The noise elimination signal generator 15 generates the noise elimination signal by subtracting the estimated noise signal from the input signal. The noise elimination signal generator 15 outputs the noise elimination signal generated to the coefficient update determination unit 16 and the output terminal 17.

The coefficient update determination unit 16 includes an absolute value calculation unit 161 and a sample position identification unit 162.

The absolute value calculation unit 161 calculates an absolute value of the noise elimination signal generated by the noise elimination signal generator 15.

The sample position identification unit 162 identifies at least one signal sample position among a plurality of signal sample positions from a signal sample position where the noise elimination signal has a maximum absolute value to a signal sample position where the noise elimination signal has an absolute value that is largest at a predetermined order.

The filter coefficient update unit 142 updates a filter coefficient of the adaptive filter 141 using the noise elimination signal at a predetermined sampling period. The adaptive filter 141 convolves the filter coefficient updated by the filter coefficient update unit 142 and the reference signal to generate the estimated noise signal. The filter coefficient update unit 142 updates the filter coefficient at the at least one signal sample position identified by the sample position identification unit 162. The at least one signal sample position is a signal sample position where the noise elimination signal has a maximum absolute value.

The filter coefficient update unit 142 updates the filter coefficient using an adaptive algorithm to minimize the noise elimination signal. Available examples of the adaptive algorithm include a learning identification method (normalized least mean square (NLMS) method), an affine projection method, and a recursive least square (RLS) method.

The output terminal 17 outputs the noise elimination signal obtained by canceling a noise component (acoustic echo component) from the input signal by the sound pick-up device 1. The output terminal 17 outputs the noise elimination signal generated by the noise elimination signal generator 15.

The input terminal 12 and the output terminal 17 are connected to a communication unit (not illustrated). The communication unit transmits the noise elimination signal to a call device (not illustrated) on the receiving side via a network, and receives a reproduction signal from the call device (not illustrated) on the receiving side via the network. The network is, for example, the Internet.

Here, update of the filter coefficient in the first embodiment will be described.

Expression (1) below is used to calculate a conventional filter coefficient.

[Expression 1]

$$pfCoef[n] = pfCoef[n] - \mu \cdot \frac{pfSpk[n+k] \cdot err[n+k]}{\sum_{i=0}^{M-1} |pfSpk[i+k]|} \quad (1)$$

In Expression (1) above, pfCoef [n] represents a filter coefficient at a tap position n, µ represents a step gain, pfSpk [n+k] represents a reference signal, err [n+k] represents a noise elimination signal, and k represents a signal sample position in one frame. The number of signal samples per frame is L, and the signal sample position k can take a value of 0 to L−1. The number of taps is M, and the tap position n can take a value of 0 to M−1.

As expressed in Expression (1) above, the number of signal samples per frame is L, so that the conventional filter coefficient is updated L times per frame. Additionally, the number of taps is M, so that the number of times of arithmetic processing per frame of the conventional filter coefficient is L*M times.

In contrast, Expression (2) below is used to calculate the filter coefficient in the first embodiment.

[Expression 2]

$$pfCoef[n] = pfCoef[n] - \mu \cdot \frac{pfSpk[n+t] \cdot \text{err\_max}}{\sum_{i=0}^{M-1} |pfSpk[i+t]|} \quad (2)$$

In Expression (2) above, pfCoef [n] represents the filter coefficient at a tap position n, µ represents a step gain, pfSpk [n+t] represents a reference signal, err max represents a maximum value of an absolute value of a noise elimination signal in one frame, and t represents a signal sample position where a noise elimination signal has a maximum absolute value in one frame. The number of signal samples per frame is L, and the signal sample position k can take a value of 0 to L−1. The number of taps is M, and the tap position n can take a value of 0 to M−1.

As expressed in Expression (2) above, one signal sample position t where the noise elimination signal has the maximum absolute value is identified from among the L signal sample positions, so that the filter coefficient of the first embodiment is updated only once per frame. Additionally, the number of taps is M, so that the number of times of arithmetic processing per frame of the filter coefficient according to the first embodiment is 1*M times.

As described above, the filter coefficient update unit 142 according to the first embodiment can significantly reduce the amount of calculation for updating the filter coefficient as compared with the related art.

The step gain µ in Expressions (1) and (2) above is also called a step size, and is a positive constant that determines an update speed of the filter coefficient.

The filter coefficient update unit 142 may change an update speed, at which the filter coefficient is updated, in accordance with the magnitude of the absolute value of the noise elimination signal at the at least one signal sample position. That is, the filter coefficient update unit 142 may change the update speed, at which the filter coefficient is updated, in accordance with the magnitude of the absolute value of the noise elimination signal at the signal sample position where the noise elimination signal has the maximum absolute value. The filter coefficient update unit 142 increases the update speed to more than the current update speed when the absolute value of the noise elimination signal at the at least one signal sample position is larger than a threshold, and reduces the update speed to less than the current update speed when the absolute value of the noise elimination signal at the at least one signal sample position is equal to or less than the threshold.

The filter coefficient update unit 142 can change the update speed of the filter coefficient by adjusting the step gain µ in Expression (2) above. That is, the filter coefficient update unit 142 increases the step gain µ when the noise elimination signal has an absolute value larger than the threshold at the signal sample position where the noise elimination signal has the maximum absolute value. As a result, the update speed of the filter coefficient becomes faster than the current update speed. In contrast, the filter coefficient update unit 142 reduces the step gain when the noise elimination signal has an absolute value equal to or less than the threshold at the signal sample position where the noise elimination signal has the maximum absolute value. As a result, the update speed of the filter coefficient becomes slower than the current update speed.

As described above, the update speed is set to more than the current update speed when the noise elimination signal at the at least one signal sample position has an absolute value larger than the threshold, so that the noise elimination signal can be roughly converged. When the noise elimination signal at the at least one signal sample position has an absolute value equal to or less than the threshold value, the update speed is set slower than the current update speed, and thus the noise elimination signal can be finely converged. As a result, improvement in both the calculation speed and the calculation accuracy can be achieved.

Subsequently, operation of the sound pick-up device 1 according to the first embodiment of the present disclosure will be described.

Figure 2:
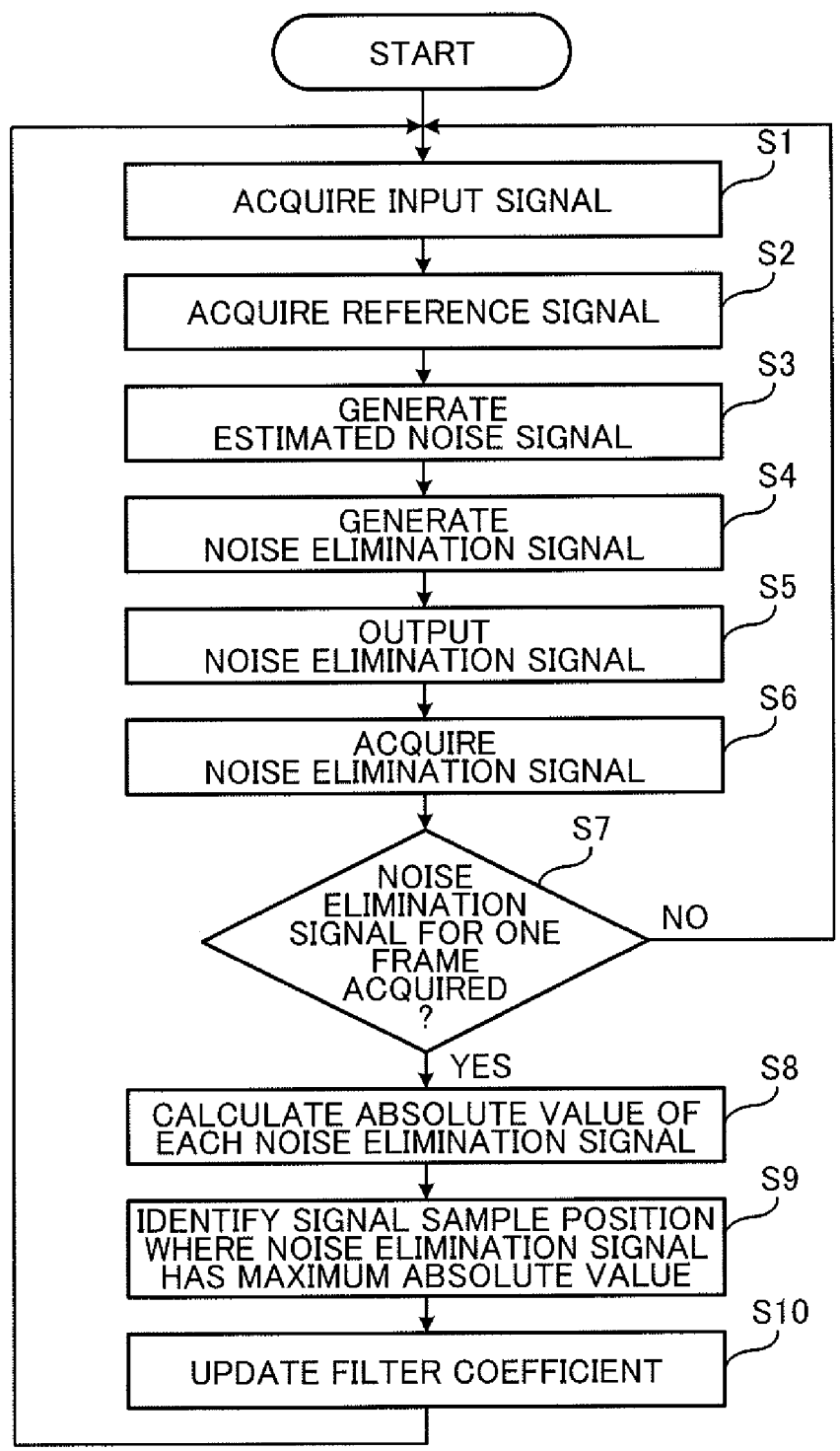
FIG. 2 is a flowchart for illustrating operation of a sound pick-up device according to the first embodiment of the present disclosure.

FIG. 2 is a flowchart for illustrating the operation of the sound pick-up device according to the first embodiment of the present disclosure.

First, in step S1, the noise elimination signal generator 15 acquires an input signal from the microphone 11. At this time, the microphone 11 outputs the input signal to the noise elimination signal generator 15.

Next, in step S2, the adaptive filter 141 of the echo canceller 14 acquires a reference signal from the input terminal 12. At this time, the input terminal 12 outputs a reproduction signal received from the call device (not illustrated) on the receiving side to the sound pick-up device 1 and the speaker 13. The adaptive filter 141 acquires the reproduction signal output from the input terminal 12 to the speaker 13 as the reference signal.

Next, in step S3, the adaptive filter 141 convolves a filter coefficient and the reference signal to generate an estimated noise signal indicating a component of a noise signal contained in the input signal.

Next, in step S4, the noise elimination signal generator 15 subtracts the estimated noise signal from the input signal to generate a noise elimination signal. The noise elimination signal generator 15 outputs the noise elimination signal generated to the coefficient update determination unit 16 and the output terminal 17.

Next, in step S5, the output terminal 17 outputs the noise elimination signal generated by the noise elimination signal generator 15.

Next, in step S6, the absolute value calculation unit 161 of the coefficient update determination unit 16 acquires the noise elimination signal generated by the noise elimination signal generator 15.

Next, in step S7, the absolute value calculation unit 161 determines whether the noise elimination signal for one frame has been acquired.

The sound pick-up device 1 includes a memory (not illustrated). The noise elimination signal generated by the noise elimination signal generator 15 is stored in the memory. The absolute value calculation unit 161 may determine whether the noise elimination signal for one frame has been acquired by determining whether the noise elimination signal for one frame has been stored in the memory.

Here, when it is determined that the noise elimination signal for one frame has not been acquired (NO in step S7), processing returns to step S1.

In contrast, when it is determined that the noise elimination signal for one frame has been acquired (YES in step S7), in step S8, the absolute value calculation unit 161 calculates an absolute value of each of noise elimination signals acquired at every signal sample position of one frame.

Next, in step S9, the sample position identification unit 162 identifies a signal sample position where the noise elimination signal has a maximum absolute value.

Next, in step S10, the filter coefficient update unit 142 updates the filter coefficient at the signal sample position identified by the sample position identification unit 162, where the noise elimination signal has the maximum absolute value.

The filter coefficient has been conventionally updated at every signal sample position of a predetermined sampling frequency. In contrast, according to the first embodiment, at least one signal sample position is identified among the plurality of signal sample positions from the signal sample position where the noise elimination signal has the maximum absolute value to the signal sample position where the noise elimination signal has the absolute value that is largest at a predetermined order, and the filter coefficient of the adaptive filter 141 is updated at the identified at least one signal sample position. Thus, the number of times of update processing of the filter coefficient of the adaptive filter 141 is reduced, so that the amount of calculation for eliminating noise can be reduced.

Although the filter coefficient update unit 142 according to the first embodiment updates the filter coefficient at the signal sample position where the noise elimination signal has the maximum absolute value, the present disclosure is not particularly limited to this configuration. The filter coefficient update unit 142 may update the filter coefficient at a signal sample position where the noise elimination signal has a second largest absolute value, or may update the filter coefficient at a signal sample position where the noise elimination signal has a third largest absolute value. That is, the filter coefficient update unit 142 may update the filter coefficient at one signal sample position among the plurality of signal sample positions from the signal sample position where the noise elimination signal has the maximum absolute value to the signal sample position where the noise elimination signal has the absolute value that is largest at a predetermined order.

The filter coefficient update unit 142 may update the filter coefficient at the signal sample position where the noise elimination signal has the maximum absolute value and the signal sample position where the noise elimination signal has the second largest absolute value. That is, the filter coefficient update unit 142 may update the filter coefficient at two or more signal sample positions among the plurality of signal sample positions from the signal sample position where the noise elimination signal has the maximum absolute value to the signal sample position where the noise elimination signal has the absolute value that is largest at a predetermined order.

Although the adaptive filter 141 according to the first embodiment receives the reproduction signal output to the speaker 13 as the reference signal and generates the estimated noise signal indicating the component of the acoustic echo signal contained in the input signal, the present disclosure is not particularly limited to this configuration. Another microphone different from the microphone 11 may be installed in a space where the microphone 11 is installed. The other microphone may acquire noise in the space, which is other than a voice to be obtained by the microphone 11, and output a signal of the acquired noise to the adaptive filter 141 as a reference signal.

Although the echo canceller 14 receives the reproduction signal in a time domain and the noise elimination signal generator 15 receives the input signal in the time domain in the first embodiment, the present disclosure is not particularly limited to this configuration. The echo canceller 14 may receive a reproduction signal in a frequency domain, and the noise elimination signal generator 15 may receive an input signal in the frequency domain.

In this case, a fast Fourier transform unit may be provided between the input terminal 12 and the speaker 13, the fast Fourier transform unit being configured to convert a reproduction signal in a time domain to be received by the echo canceller 14 into a reproduction signal in a frequency domain. Alternatively, a fast Fourier transform unit may be provided between the microphone 11 and the noise elimination signal generator 15, the fast Fourier transform unit being configured to convert an input signal in a time domain to be received by the noise elimination signal generator 15 into an input signal in a frequency domain. Additionally, an inverse fast Fourier transform unit may be provided between the noise elimination signal generator 15 and the output terminal 17, the inverse fast Fourier transform unit being configured to convert a noise elimination signal in a frequency domain to be received by the output terminal 17 from the noise elimination signal generator 15 into a noise elimination signal in a time domain.

Second Embodiment

Although the call device according to the first embodiment includes the one microphone 11, a call device according to a second embodiment includes a plurality of microphones.

Figure 3:
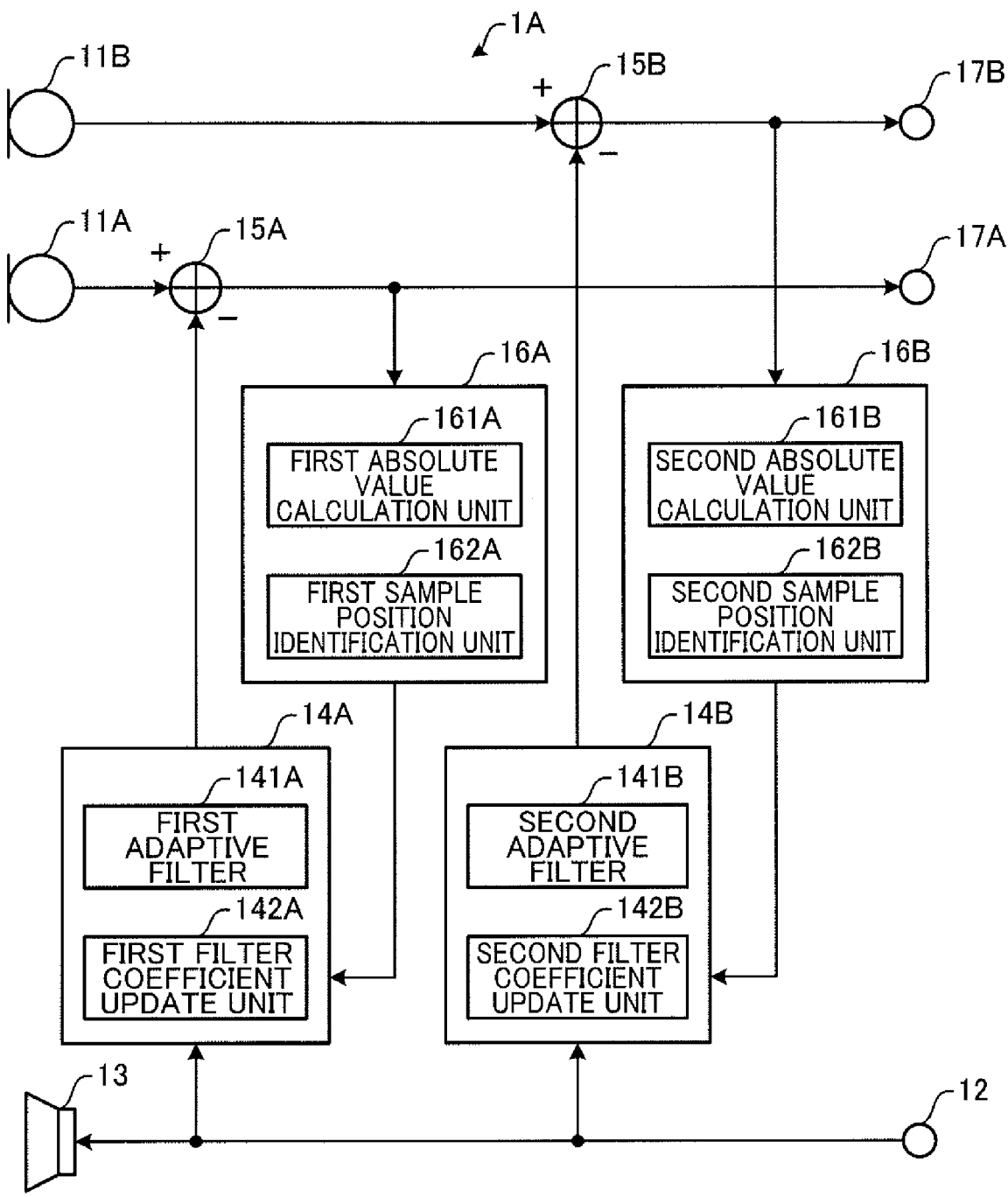
FIG. 3 is a diagram illustrating a configuration of a call device according to a second embodiment of the present disclosure.

FIG. 3 is a diagram illustrating a configuration of the call device according to the second embodiment of the present disclosure.

The call device illustrated in FIG. 3 includes a sound pick-up device 1A, a first microphone 11A, a second microphone 11B, an input terminal 12, a speaker 13, a first output terminal 17A, and a second output terminal 17B. In the second embodiment, the same components as those in the first embodiment are denoted by the same reference numerals, and duplicated description thereof will be eliminated.

The first microphone 11A and the second microphone 11B are disposed in a space where a talker is present, and collect a voice of the talker. The first microphone 11A outputs a first input signal indicating the collected voice to the sound pick-up device 1A. The second microphone 11B outputs a second input signal indicating the collected voice to the sound pick-up device 1A.

The first output terminal 17A outputs a first noise elimination signal obtained by canceling a noise component (acoustic echo component) from the first input signal by the sound pick-up device 1A. The second output terminal 17B outputs a second noise elimination signal obtained by canceling a noise component (acoustic echo component) from the second input signal by the sound pick-up device 1A.

The input terminal 12, the first output terminal 17A, and the second output terminal 17B are connected to a communication unit (not illustrated). The communication unit transmits the noise elimination signal to a call device (not illustrated) on the receiving side via a network, and receives a reproduction signal from the call device (not illustrated) on the receiving side via the network.

The sound pick-up device 1A includes a first echo canceller 14A, a first noise elimination signal generator 15A, a first coefficient update determination unit 16A, a second echo canceller 14B, a second noise elimination signal generator 15B, and a second coefficient update determination unit 16B.

The first echo canceller 14A includes a first adaptive filter 141A and a first filter coefficient update unit 142A. The second echo canceller 14B includes a second adaptive filter 141B and a second filter coefficient update unit 142B.

The first adaptive filter 141A generates, from a reference signal, a first estimated noise signal indicating a component of a noise signal contained in the first input signal acquired by the first microphone 11A.

The second adaptive filter 141B generates, from the reference signal, a second estimated noise signal indicating a component of a noise signal contained in the second input signal acquired by the second microphone 11B different from the first microphone 11A.

The first noise elimination signal generator 15A generates the first noise elimination signal that is to be obtained by subtracting the first estimated noise signal from the first input signal. The first noise elimination signal generator 15A generates the first noise elimination signal by subtracting the first estimated noise signal from the first input signal. The first noise elimination signal generator 15A outputs the first noise elimination signal generated to the first coefficient update determination unit 16A and the first output terminal 17A.

The second noise elimination signal generator 15B generates the second noise elimination signal that is to be obtained by subtracting the second estimated noise signal from the second input signal. The second noise elimination signal generator 15B generates the second noise elimination signal by subtracting the second estimated noise signal from the second input signal. The second noise elimination signal generator 15B outputs the second noise elimination signal generated to the second coefficient update determination unit 16B and the second output terminal 17B.

The first coefficient update determination unit 16A includes a first absolute value calculation unit 161A and a first sample position identification unit 162A. The second coefficient update determination unit 16B includes a second absolute value calculation unit 161B and a second sample position identification unit 162B.

The first absolute value calculation unit 161A calculates an absolute value of the first noise elimination signal generated by the first noise elimination signal generator 15A.

The first sample position identification unit 162A identifies at least one signal sample position among a plurality of signal sample positions from a signal sample position where the first noise elimination signal has a maximum absolute value to a signal sample position where the noise elimination signal has an absolute value that is largest at a predetermined order.

The second absolute value calculation unit 161B calculates an absolute value of the second noise elimination signal generated by the second noise elimination signal generator 15B.

The second sample position identification unit 162B identifies at least one signal sample position among a plurality of signal sample positions from a signal sample position where the second noise elimination signal has a maximum absolute value to a signal sample position where the noise elimination signal has an absolute value that is largest at a predetermined order.

The first filter coefficient update unit 142A updates a filter coefficient of the first adaptive filter 141A using the first noise elimination signal. The first adaptive filter 141A convolves the filter coefficient updated by the first filter coefficient update unit 142A and the reference signal to generate the first estimated noise signal. The first filter coefficient update unit 142A updates the filter coefficient at the at least one signal sample position identified by the first sample position identification unit 162A. The at least one signal sample position is a signal sample position where the first noise elimination signal has a maximum absolute value.

The second filter coefficient update unit 142B updates a filter coefficient of the second adaptive filter 141B using the second noise elimination signal. The second adaptive filter 141B convolves the filter coefficient updated by the second filter coefficient update unit 142B and the reference signal to generate the second estimated noise signal. The second filter coefficient update unit 142B updates the filter coefficient at the at least one signal sample position identified by the second sample position identification unit 162B. The at least one signal sample position is a signal sample position where the second noise elimination signal has a maximum absolute value.

Update processing of a filter coefficient in the second embodiment is the same as the update processing of a filter coefficient in the first embodiment.

Although the call device according to the second embodiment includes two microphones, the present disclosure is not particularly limited to this configuration, and thus the call device may include three or more microphones.

As described above, every time when the microphones are increased in number by one, the echo canceller and the coefficient update determination unit are each also increased in number by one. However, even when the microphones are increased in number, the amount of calculation of each processing is reduced as compared with the related art, and thus the amount of calculation of the entire processing can be reduced as compared with the related art.

Third Embodiment

A sound pick-up device according to a third embodiment is configured as follows: dividing an input signal into a plurality of frequency bands; dividing a reference signal into a plurality of frequency bands; generating a noise elimination signal for each of the plurality of frequency bands; and synthesizing the noise elimination signal generated for each of the plurality of frequency bands.

Figure 4:
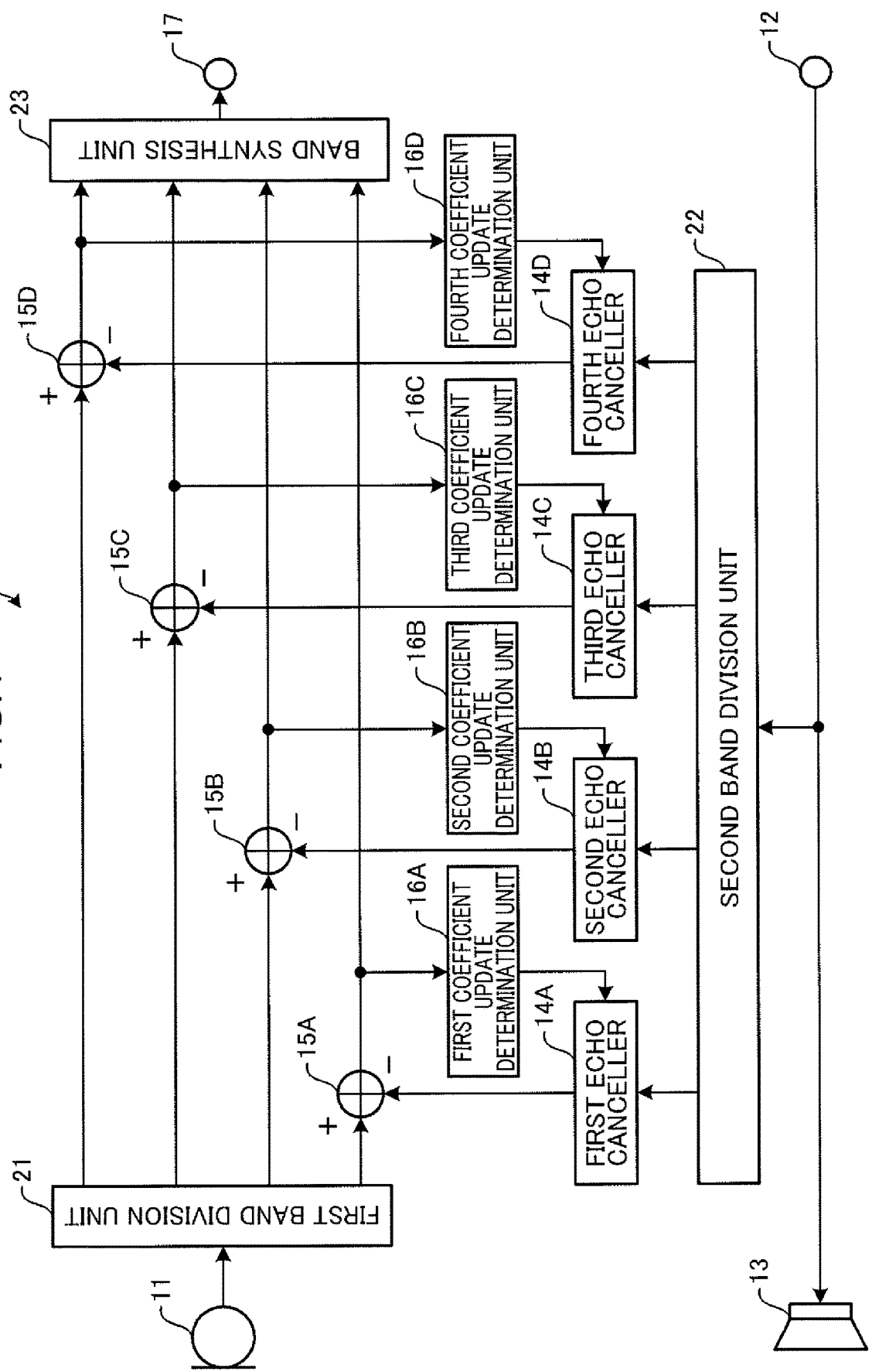
FIG. 4 is a diagram illustrating a configuration of a call device according to a third embodiment of the present disclosure.

FIG. 4 is a diagram illustrating a configuration of a call device according to the third embodiment of the present disclosure.

The call device illustrated in FIG. 4 includes a sound pick-up device 1B, a microphone 11, an input terminal 12, a speaker 13, and an output terminal 17. In the third embodiment, the same components as those in the first embodiment are denoted by the same reference numerals, and duplicated description thereof will be eliminated.

The sound pick-up device 1B includes a first echo canceller 14A, a first noise elimination signal generator 15A, a first coefficient update determination unit 16A, a second echo canceller 14B, a second noise elimination signal generator 15B, a second coefficient update determination unit 16B, a third echo canceller 14C, a third noise elimination signal generator 15C, a third coefficient update determination unit 16C, a fourth echo canceller 14D, a fourth noise elimination signal generator 15D, a fourth coefficient update determination unit 16D, a first band division unit 21, a second band division unit 22, and a band synthesis unit 23.

The first band division unit 21 divides the input signal output from the microphone 11 into a plurality of frequency bands. In the third embodiment, the input signal is divided into four frequency bands. The first band division unit 21 divides an input signal in a full band into signals in four sub-bands different in frequency band. The first band division unit 21 outputs each of the input signals in the four sub-bands to the corresponding one of the first noise elimination signal generator 15A, the second noise elimination signal generator 15B, the third noise elimination signal generator 15C, and the fourth noise elimination signal generator 15D.

The second band division unit 22 divides the reference signal output from the input terminal 12 into a plurality of frequency bands. In the third embodiment, the reference signal is divided into four frequency bands. The second band division unit 22 divides the reference signal in a full band into reference signals in four sub-bands different in frequency band. The second band division unit 22 outputs each of the reference signals in the four sub-bands to the corresponding one of the first echo canceller 14A, the second echo canceller 14B, the third echo canceller 14C, and the fourth echo canceller 14D.

The first echo canceller 14A, the second echo canceller 14B, the third echo canceller 14C, and the fourth echo canceller 14D are identical in configuration to the echo canceller 14 in the first embodiment. That is, each of the first echo canceller 14A, the second echo canceller 14B, the third echo canceller 14C, and the fourth echo canceller 14D includes an adaptive filter 141 and a filter coefficient update unit 142.

The first coefficient update determination unit 16A, the second coefficient update determination unit 16B, the third coefficient update determination unit 16C, and the fourth coefficient update determination unit 16D are identical in configuration to the coefficient update determination unit 16 in the first embodiment. That is, each of the first coefficient update determination unit 16A, the second coefficient update determination unit 16B, the third coefficient update determination unit 16C, and the fourth coefficient update determination unit 16D includes an absolute value calculation unit 161 and a sample position identification unit 162.

Each of the plurality of adaptive filters 141 generates an estimated noise signal for the corresponding one of the plurality of frequency bands.

Each of the first noise elimination signal generator 15A, the second noise elimination signal generator 15B, the third noise elimination signal generator 15C, and the fourth noise elimination signal generator 15D generates a noise elimination signal for the corresponding one of the plurality of frequency bands.

Each of the plurality of sample position identification units 162 identifies at least one signal sample position for the corresponding one of the plurality of frequency bands.

Each of the plurality of filter coefficient update units 142 updates the filter coefficient at the at least one signal sample position for the corresponding one of the plurality of frequency bands. Update processing of a filter coefficient in the third embodiment is the same as the update processing of a filter coefficient in the first embodiment.

The band synthesis unit 23 synthesizes the noise elimination signal generated for each of the plurality of frequency bands. The band synthesis unit 23 synthesizes the noise elimination signals generated by the first noise elimination signal generator 15A, the second noise elimination signal generator 15B, the third noise elimination signal generator 15C, and the fourth noise elimination signal generator 15D. The band synthesis unit 23 synthesizes the noise elimination signals in four sub-bands into a noise elimination signal in a full band. The band synthesis unit 23 outputs the noise elimination signal in the full band to the output terminal 17.

Although the input signal and the reference signal are each divided into four frequency bands in the third embodiment, the present disclosure is not particularly limited to this configuration, and thus each of the input signal and the reference signal may be divided into two frequency bands, three frequency bands, or five or more frequency bands.

As described above, the input signal and the reference signal are each divided into the plurality of frequency bands, and generation processing of the estimated noise signal, generation processing of the noise elimination signal, identification processing of the signal sample position, and update processing of the filter coefficient are performed for each of the plurality of frequency bands. Thus, calculation time can be shortened, and the amount of calculation per unit time can be reduced.

In each of the above embodiments, each constituent may be configured by dedicated hardware, or may be fabricated by executing a software program suitable for each constituent. Each constituent may be fabricated by a program execution unit such as a CPU or a processor reading and executing a software program recorded on a recording medium such as a hard disk or a semiconductor memory. Alternatively, the program may be executed by another independent computer system by recording and transferring the program on a recording medium or transferring the program via a network.

Some or all of functions of the devices according to the embodiments of the present disclosure are typically fabricated using a large scale integration (LSI) that is an integrated circuit. The functions may be individually integrated into one chip, or may be integrated into one chip including some or all of the functions. The integrated circuit is not limited to the LSI, and may be fabricated by a dedicated circuit or a general-purpose processor. A field programmable gate array (FPGA) that can be programmed after manufacturing an LSI, or a reconfigurable processor that can reconfigure connection and setting of circuit cells inside an LSI, may be used.

Additionally, some or all of functions of the devices according to the embodiments of the present disclosure may be implemented by a processor such as a CPU executing a program.

The numbers used above are merely examples for specifically describing the present disclosure, and the present disclosure is not limited to the illustrated numbers.

The order in which the steps shown in the above flowcharts are performed is merely an example for specifically describing the present disclosure, and any order other than the above may be available as long as a similar effect can be obtained. Some of the above steps may be performed simultaneously (in parallel) with another step.

INDUSTRIAL APPLICABILITY

The technique according to the present disclosure can reduce the amount of calculation for eliminating noise, and thus is useful for a technique for eliminating a noise signal contained in an input signal acquired by a microphone.

The invention claimed is:

1. A sound pick-up device comprising:
an adaptive filter configured to generate, from a reference signal, an estimated noise signal indicating a component of a noise signal contained in an input signal acquired by a microphone;
a signal generator configured to generate a noise elimination signal by subtracting the estimated noise signal from the input signal;
a coefficient update unit configured to update a filter coefficient of the adaptive filter using the noise elimination signal; and
an identification unit configured to identify at least one signal sample position among a plurality of signal sample positions from a signal sample position where the noise elimination signal has a maximum absolute value to a signal sample position where the noise elimination signal has an absolute value that is largest at a predetermined order,
wherein the coefficient update unit updates the filter coefficient at the at least one signal sample position identified by the identification unit.

2. The sound pick-up device according to claim 1, wherein the at least one signal sample position is a signal sample position where the noise elimination signal has a maximum absolute value.

3. The sound pick-up device according to claim 1, wherein the reference signal is a reproduction signal output to a speaker.

4. The sound pick-up device according to claim 1, wherein the coefficient update unit changes an update speed, at which the filter coefficient is updated, in accordance with magnitude of the absolute value of the noise elimination signal at the at least one signal sample position.

5. The sound pick-up device according to claim 4, wherein the coefficient update unit increases the update speed to more than a current update speed when the absolute value of the noise elimination signal at the at least one signal sample position is larger than a threshold, and reduces the update speed to less than the current update speed when the absolute value of the noise elimination signal at the at least one signal sample position is equal to or less than the threshold.

6. The sound pick-up device according to claim 1, further comprising:
a first band division unit that divides the input signal into a plurality of frequency bands;
a second band division unit that divides the reference signal into the plurality of frequency bands; and
a band synthesis unit that synthesizes the noise elimination signal generated for each of the plurality of frequency bands,
wherein the adaptive filter includes a plurality of adaptive filters that each generate the estimated noise signal for the corresponding one of the plurality of frequency bands,
the signal generator includes a plurality of signal generators that each generate the noise elimination signal for the corresponding one of the plurality of frequency bands,
the identification unit includes a plurality of identification units that each identify the at least one signal sample position for the corresponding one of the plurality of frequency bands, and
the coefficient update unit includes a plurality of coefficient update units that each update the filter coefficient at the at least one signal sample position for the corresponding one of the plurality of frequency bands.

7. The sound pick-up device according to claim 1, wherein
the adaptive filter includes
a first adaptive filter that generates, from a reference signal, a first estimated noise signal indicating a component of a noise signal contained in a first input signal acquired by a first microphone, and a second adaptive filter that generates, from the reference signal, a second estimated noise signal indicating a component of a noise signal contained in a second input signal acquired by a second microphone different from the first microphone, the signal generator includes a first signal generator that generates a first noise elimination signal obtained by subtracting the first estimated noise signal from the first input signal, and a second signal generator that generates a second noise elimination signal obtained by subtracting the second estimated noise signal from the second input signal, the coefficient update unit includes a first coefficient update unit that updates a filter coefficient of the first adaptive filter using the first noise elimination signal, and a second coefficient update unit that updates a filter coefficient of the second adaptive filter using the second noise elimination signal, and the identification unit may include a first identification unit that identifies at least one signal sample position among a plurality of signal sample positions from a signal sample position where the first noise elimination signal has a maximum absolute value to a signal sample position where the first noise elimination signal has an absolute value that is largest at a predetermined order, and a second identification unit that identifies at least one signal sample position among a plurality of signal sample positions from a signal sample position where the second noise elimination signal has a maximum absolute value to a signal sample position where the second noise elimination signal has an absolute value that is largest at a predetermined order.

8. A sound pick-up method for a sound pick-up device including an adaptive filter, a signal generator, a coefficient update unit, and an identification unit, the sound pick-up method comprising the steps of:

causing the adaptive filter to generate, from a reference signal, an estimated noise signal indicating a component of a noise signal contained in an input signal acquired by a microphone;

causing the signal generator to generate a noise elimination signal obtained by subtracting the estimated noise signal from the input signal;

causing the identification unit to identify at least one signal sample position among a plurality of signal sample positions from a signal sample position where the noise elimination signal has a maximum absolute value to a signal sample position where the noise elimination signal has an absolute value that is largest at a predetermined order; and causing the coefficient update unit to update a filter coefficient of the adaptive filter using the noise elimination signal at the identified at least one signal sample position.

9. A non-transitory computer-readable recording medium recording a sound-pickup program that causes a computer to function as:

an adaptive filter configured to generate, from a reference signal, an estimated noise signal indicating a component of a noise signal contained in an input signal acquired by a microphone;

a signal generator configured to generate a noise elimination signal by subtracting the estimated noise signal from the input signal;

a coefficient update unit configured to update a filter coefficient of the adaptive filter using the noise elimination signal; and an identification unit configured to specify at least one signal sample position among a plurality of signal sample positions from a signal sample position where the noise elimination signal has a maximum absolute value to a signal sample position where the noise elimination signal has an absolute value that is largest at a predetermined order, wherein the coefficient update unit updates the filter coefficient at the at least one signal sample position specified by the identification unit.

* * * * *